US012124487B2

(12) United States Patent
Ramamohan (10) Patent No.: US 12,124,487 B2
(45) Date of Patent: *Oct. 22, 2024

(54) SEARCH PLATFORM FOR UNSTRUCTURED INTERACTION SUMMARIES (71) Applicant: Capital One Services, LLC, McLean, VA (US)

(72) Inventor: Deepak Ramamohan, Karnataka (IN)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/129,997

(22) Filed: Apr. 3, 2023

(65) Prior Publication Data

US 2023/0334075 A1 Oct. 19, 2023

Related U.S. Application Data (63) Continuation of application No. 17/319,940, filed on May 13, 2021, now Pat. No. 11,620,319.

(51) Int. Cl.
*G06F 16/33* (2019.01)
*G06F 16/338* (2019.01)
*G06N 20/00* (2019.01)

(52) U.S. Cl.
CPC ...... *G06F 16/3338* (2019.01); *G06F 16/3347* (2019.01); *G06F 16/338* (2019.01); *G06N 20/00* (2019.01)

(58) Field of Classification Search
CPC .................................. G06F 16/3338
USPC .......................................... 707/765
See application file for complete search history.

(56) References Cited

U.S. PATENT DOCUMENTS

| 7,606,714 | B2 | 10/2009 | Williams |
| 9,477,752 | B1 | 10/2016 | Romano |
| 9,767,165 | B1 * | 9/2017 | Tacchi ................ G06F 16/9535 |
| 10,754,883 | B1 | 8/2020 | Kannu |

(Continued)

OTHER PUBLICATIONS

Gildea et al., "Topic-Based Language Models Using EM", Proc. 6th European Conference on Speech Communication and Technology (Eurospeech 1999), 2167-2170, doi: 10.21437/Eurospeech. 1999-479.

(Continued)

*Primary Examiner* — Muluemebet Gurmu
(74) *Attorney, Agent, or Firm* — KDW FIRM PLLC (57) ABSTRACT Systems, methods, and computer program products for search platforms for unstructured interaction summaries. An application executing on a processor may receive a query comprising a term. The application may generate, based on an embedding vector and the term, an expanded query comprising a plurality of additional terms. The application may generate, based on a term frequency inverse document frequency model, a vector for the expanded query and generate an entity vector for the query. The application may generate a combined vector for the query based on the entity vector and the vector for the expanded query. The application may compute, based on the combined vector for the query and a feature matrix of a corpus, a respective cosine similarity score for a plurality of results in the corpus. The application may return one or more of the plurality of results as responsive to the query based on the similarity scores.

20 Claims, 9 Drawing Sheets (56) References Cited

U.S. PATENT DOCUMENTS

| | | |
|---|---|---|
| 11,023,675 B1 | 6/2021 | Neervannan et al. |
| 2004/0210443 A1 | 10/2004 | Kuhn |
| 2012/0259801 A1 | 10/2012 | Ji |
| 2017/0353605 A1 | 12/2017 | Dumaine et al. |
| 2018/0121539 A1* | 5/2018 | Ciulla ................. G06F 16/3344 |
| 2019/0139551 A1 | 5/2019 | Steelberg |
| 2019/0163817 A1* | 5/2019 | Milenova ................ G06F 16/35 |
| 2020/0302011 A1 | 9/2020 | Mishra et al. |
| 2020/0410012 A1* | 12/2020 | Moon .................... G06Q 10/04 |
| 2021/0157990 A1 | 5/2021 | Lima et al. |
| 2021/0158234 A1 | 5/2021 | Sivasubramanian |
| 2022/0230116 A1 | 7/2022 | Dubey et al. |
| 2022/0296107 A1 | 9/2022 | McKenna |
| 2022/0318485 A1 | 10/2022 | Narayanan et al. |
| 2022/0365955 A1* | 11/2022 | Ramamohan ......... G06F 16/338 |

OTHER PUBLICATIONS

Levine et al., "PMI-Masking: Principled masking of correlated spans", arXiv:2010.01825v1 [cs.LG] Oct. 5, 2020 https://doi.org/10.48550/arXiv.2010.01825.

\* cited by examiner

With multiple Entities built multiple additional dimensions will be added to the document vectors (one for each entity)

120 — Agent Note

| Agent Note | $X_1$ | $X_2$ | $X_3$ | ... | $X_{nn}$ | $X_{nn}$ | Bureau | Payment | LM Product | Natural Disaster |
|---|---|---|---|---|---|---|---|---|---|---|
| Customer states CBR reporting of late payment are inaccurate due to no payments were missed | 1 | 0 | 2 | 0 | 1 | 1 | 1 | 0 | 0 |
| Borrower stated that he is disappointed that his request for double extension got declined | 0 | 1 | 1 | 0 | 2 | 1 | 0 | 1 | 0 |
| Customer is still struggling from hurricane Harvey and needs an ext | 0 | 0 | 1 | 1 | 0 | 0 | 0 | 1 | 1 |

Additional dimensions for entities added

FIG. 3A

312 — Query: requests by customers affected by hurricane

| Results | $X_1$ | $X_2$ | $X_3$ | ... | $X_{nn}$ | $X_{nn}$ | Bureau | Payment | LM Product | Natural Disaster |
|---|---|---|---|---|---|---|---|---|---|---|
| 314 ✓ Customer is requesting an ext due to hurricane | 1 | 0 | 0 | 2 | 1 | 0 | 0 | 1 | 1 |
| 316 ✓ Cust requests an ext as her house flooded due to disaster | 1 | 1 | 0 | 0 | 1 | 0 | 0 | 1 | 1 |
| 318 ✓ Borrower wants some assistance due to harvey disaster | 0 | 2 | 1 | 1 | 0 | 0 | 0 | 0 | 1 |

SEARCH PLATFORM FOR UNSTRUCTURED INTERACTION SUMMARIES

CROSS-REFERENCE TO RELATED APPLICATIONS

This application is a continuation of U.S. patent application Ser. No. 17/319,940, filed on May 13, 2021, the disclosure of which is incorporated herein by reference in its entirety.

BACKGROUND

Often, users must contact customer support agents for assistance with problems. Agents may assist these users with various issues and create text summaries of each customer interaction. However, these summaries often have acronyms, shorthand notation, and varying word choices, making conventional solutions ineffective for searching. Furthermore, the summaries often lack correct grammatical structure, punctuations, and other attributes that further exacerbate the difficulty in searches.

BRIEF SUMMARY

Search platforms for unstructured interaction summaries. In various embodiments, a computer-implemented method includes receiving, by an application executing on a processor, a query comprising a term, generating, by the application based on an embedding vector and the term, an expanded query comprising a plurality of additional terms, generating, by the application based on a feature matrix of a corpus, a vector for the expanded query, generating, by the application, an entity vector for the query, generating, by the application, a combined vector for the query based on the entity vector and the vector for the expanded query, computing, by the application based on the combined vector for the query and the feature matrix of the corpus, a respective cosine similarity score for a plurality of results in the corpus, and returning, by the application, one or more of the plurality of results as responsive to the query based on the computed cosine similarity scores.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments disclosed herein provide a search platform that allows users to submit text queries and receive relevant results from an unstructured corpus of text-based summaries of customer interactions. The search platform may leverage natural language processing (NLP) techniques, including, but not limited to bag-of-words-based term frequency-inverse document frequency (TF-IDF) models and/or word embeddings. The corpus of text-based summaries of customer interactions may be unstructured in that different agents who assist users may use any number of terms, styles, grammatical structures, punctuation (if any) when generating a given summary of a support conversation. By preprocessing the corpus and generating different models to represent the corpus, embodiments disclosed herein may facilitate more accurate search results using the corpus. For example, a query that specifies "default" may receive results that include "late payments", "missed payments", etc., even though the term "default" does not match "late payments" or "missed payments" based on conventional comparison techniques.

More specifically, when receiving a query, embodiments disclosed herein may preprocess the query to standardize or otherwise format the text of the query. An entity vectorizer may compute an entity vector for the query, where the entity vector reflects whether one or more entities are present in the query. Furthermore, embodiments disclosed herein may expand one or more terms of the query using word embeddings that reflect terms that are similar to the terms of the query. Doing so may provide a more robust query that may result in more search "hits" against the corpus of information. A TF-IDF vectorizer may then compute a vector for the expanded query. Embodiments disclosed herein may then combine the entity vector and the vector for the expanded query, e.g., by concatenating the vectors. A cosine similarity score may be computed for the query relative to a plurality of results in the corpus. One or more results may be selected and returned as responsive to the query based on the similarity scores.

Furthermore, in some embodiments, a user may provide feedback to further narrow search results. For example, a user may tag search results with labels indicating a given result is relevant and/or not relevant to the query. Advantageously, embodiments disclosed herein incorporate the feedback in real time by updating the results based on the feedback.

Advantageously, embodiments disclosed herein improve computer-based searches of unstructured text. For example, conventional search solutions do not port well to unstructured text corpora. However, by leveraging the techniques of the disclosure, embodiments disclosed herein may return more accurate results from an unstructured corpus of text. Furthermore, the embodiments of the disclosure do not require labeling of the corpus of text, which is required by conventional solutions. By removing the need to label the corpus, embodiments disclosed herein improve the search performance without requiring the expenditure of significant resources to manually tag the corpus. Further still, by leveraging word embeddings in an optimized processing pipeline, embodiments disclosed herein improve the speed of processing a query, as the optimized pipeline may linearly compute vectors without requiring computationally expensive for-loops.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. However, the novel embodiments can be practiced without these specific details. In other instances, structures and devices are shown in block diagram form in order to facilitate a description thereof. The intention is to cover all modifications, equivalents, and alternatives consistent with the claimed subject matter.

In the Figures and the accompanying description, the designations "a" and "b" and "c" (and similar designators) are intended to be variables representing any positive integer. Thus, for example, if an implementation sets a value for a=5, then a complete set of components 123 illustrated as components 123-1 through 123-$a$ (or 123$a$) may include components 123-1, 123-2, 123-3, 123-4, and 123-5. The embodiments are not limited in this context.

Figure 1:
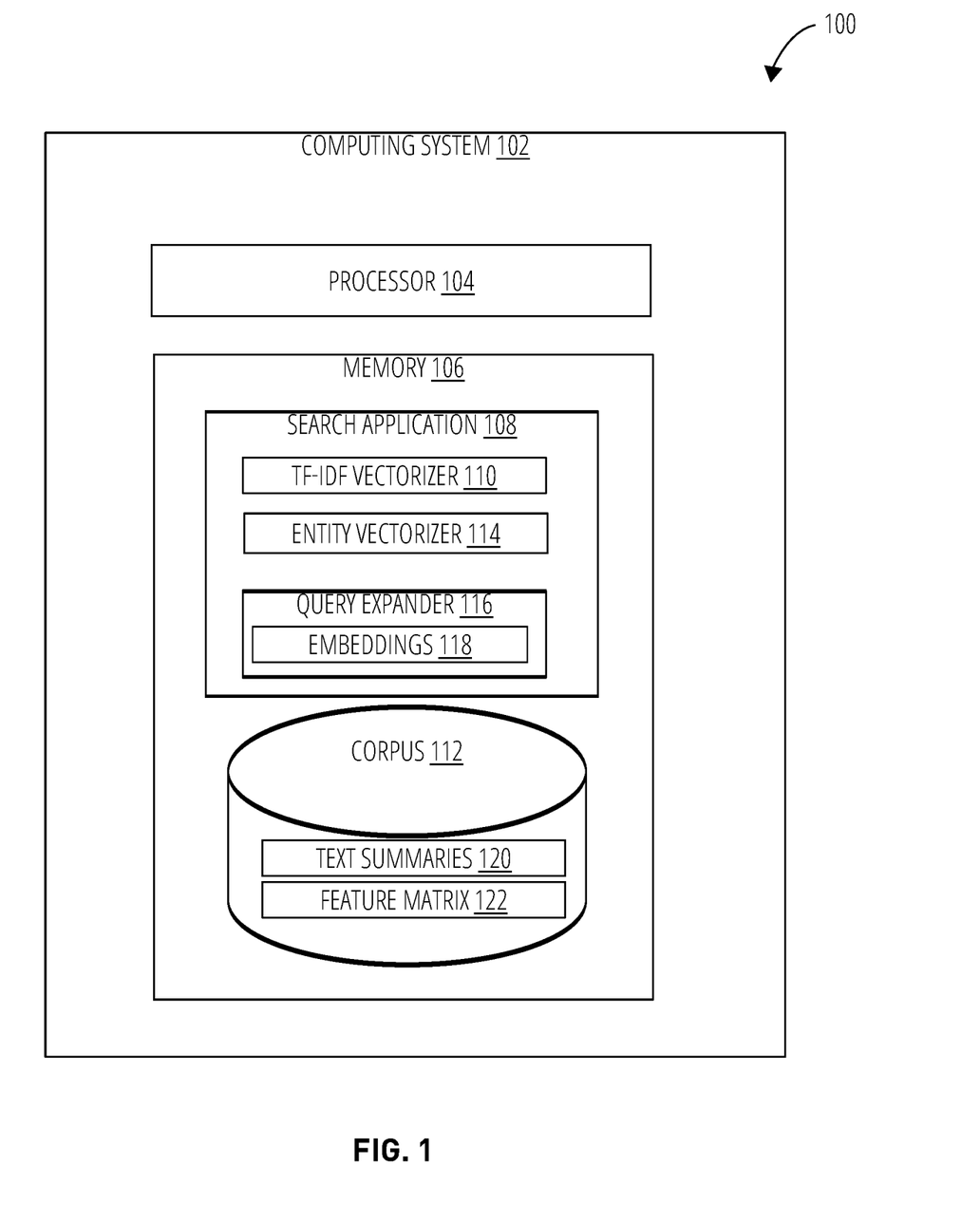
FIG. 1 illustrates an aspect of the subject matter in accordance with one embodiment.

FIG. 1 depicts a schematic of an exemplary system 100, consistent with disclosed embodiments. As shown, the system 100 includes at least one computing system 102. The computing system 102 comprises at least a processor 104 and a memory 106. As shown, the memory 106 includes a search application 108 and a corpus 112. The computing system 102 is representative of any type of computing system or device, such as a server, compute cluster, cloud computing environment, virtualized computing system, and the like. The search application 108 is representative of any type of database management system (DBMS), search platform, search engine, or other application for receiving a query as input and returning one or more results from the corpus 112 as responsive to the query.

The corpus 112 may be a corpus of a plurality of text-based summaries 120 of conversations (e.g., phone calls, online text-based chat sessions, etc.) between one or more customer service agents and one or more customers. The text summaries 120 may be summaries generated by the agent which handled the support call. Therefore, the text summaries 120 may vary in terminology used, the use of punctuation, grammatical structure, and the like. Stated differently, the text of the text summaries 120 is unstructured. For example, customers A and B may speak with agents Y and Z, respectively, regarding a credit increase. However, agent Y may use the term "credit increase" while agent Z may use the term "credit lift." Therefore, a search query processed by conventional search platforms may not return both results (e.g., if the query specifies "credit lift", the text summary 120 generated by agent Y may not be returned, as "credit lift" may not match "credit increase"). Advantageously, however, the search application 108 may return more accurate results as described in greater detail herein.

As shown, the search application 108 includes a TF-IDF vectorizer 110, an entity vectorizer 114, and a query expander 116. The TF-IDF vectorizer 110, entity vectorizer 114, and query expander 116 are representative of any type of machine learning model. Example machine learning models include, but are not limited to, neural networks, linear classifiers, logistic regression models, support vector machines, quadratic classifiers, kernel estimators, decision trees, and random forests, or any combination thereof. The use of a particular machine learning model should not be considered limiting of the disclosure. The TF-IDF vectorizer 110 is configured to generate an n-dimensional vector of numerical values (e.g., integer values, floating point values, etc.) to represent text. In various embodiments, the TF-IDF vectorizer 110 is based on a bag-of-words TF-IDF model which represents input text as the multiset of the words in the text, disregarding grammar and/or word order, but maintaining multiplicity. More generally, the TF-IDF vectorizer 110 represents each word in input text as a feature in a vector. The entity vectorizer 114 is configured to generate an entity vector reflecting whether or not a given query includes a reference to a plurality of different entities. The entity vector may be an n-dimensional vector of numerical values (e.g., integer, floating point, etc.), where each dimension corresponds to a predefined entity. For example, if a given text summary 120 includes the term, or concept, "payment," the entity vectorizer 114 may append, to a vector for the text summary 120, an entry for the concept of "payment," and an indication that the concept is present in the summary 120 (e.g., a value of 1 in the entry corresponding to the concept of "payment" in the vector).

As shown, the query expander 116 includes an embeddings layer (or vector) 118. Using the embeddings 118, the query expander 116 may identify a plurality of terms related to a given term in a search query. For example, if the search query provided by a user specifies "hurricane," the query expander 116 may expand the query to include the terms "storm", "disaster", or other words that are related to the term "hurricane", where the relationships are defined at least in part by the embeddings 118. The embeddings 118 may compute a score for each term based on a respective weight value for the embeddings 118.

Values for the embeddings 118 may be initialized and trained based on the text summaries 120 of the corpus 112. Generally, an embedding is an n-dimensional vector of floating point numerical values. For example, the embeddings 118 may include any number of dimensions, such as 1000 dimensions. In such an embodiment, the embeddings 118 may include 1000 floating point values. In such an example, the embeddings 118 of the TF-IDF vectorizer 110 may include 1000 processing units (e.g., 1000 neurons, one neuron for each dimension of the embeddings 118) with associated embedding (or weight) values. Embodiments are not limited in this context. In some embodiments, the embeddings 118 are initialized with initial values, which may be randomly assigned. By training the embeddings 118 based on the corpus 112, the embeddings 118 reflect relationships between different words. For example, the embeddings 118 may specify a strong relationship (e.g., 0.95 on a range of 0.0-1.0) between the terms "hurricane" and "storm," while specifying a weak relationship (e.g., 0.25) between the terms "hurricane" and "paradise." Therefore, based on the embeddings 118, the query expander 116 may identify one or more additional terms related to each term of a query. Any scores and/or vectors computed for the expanded query may be based at least in part on the embeddings 118 value for the terms added to the query. Continuing with the previous example, the query expander 116 may add the contextually similar terms "storm" and "disaster" to the query specifying the term "hurricane." In some embodiments, the query expander 116 adds terms to the query based on the embeddings 118 value for each term exceeding an expansion threshold, e.g., 0.6 on a scale of 0.0-1.0.

The feature matrix 122 is representative of a plurality of vectors which may be learned during training of the TF-IDF vectorizer 110 based on the corpus 112. Although depicted as a component of the corpus 112, the feature matrix 122 may be a component of the TF-IDF vectorizer 110. Generally, a given vector in the feature matrix 122 may correspond to a feature vector describing one of the text summaries 120. In some embodiments, the feature matrix 122 may include TF-IDF values for each term in a given one of the text summaries 120. More generally, the feature matrix 122 may represent words in the text summaries 120 as low-dimensional vectors that are learned from context relative to neighboring words. Therefore, during training of the TF-IDF vectorizer 110, the feature matrix 122 may include feature vectors that are similar for the terms "happy" and "delighted," while having feature vectors that are different for "happy" and "sad."

Figure 2A:
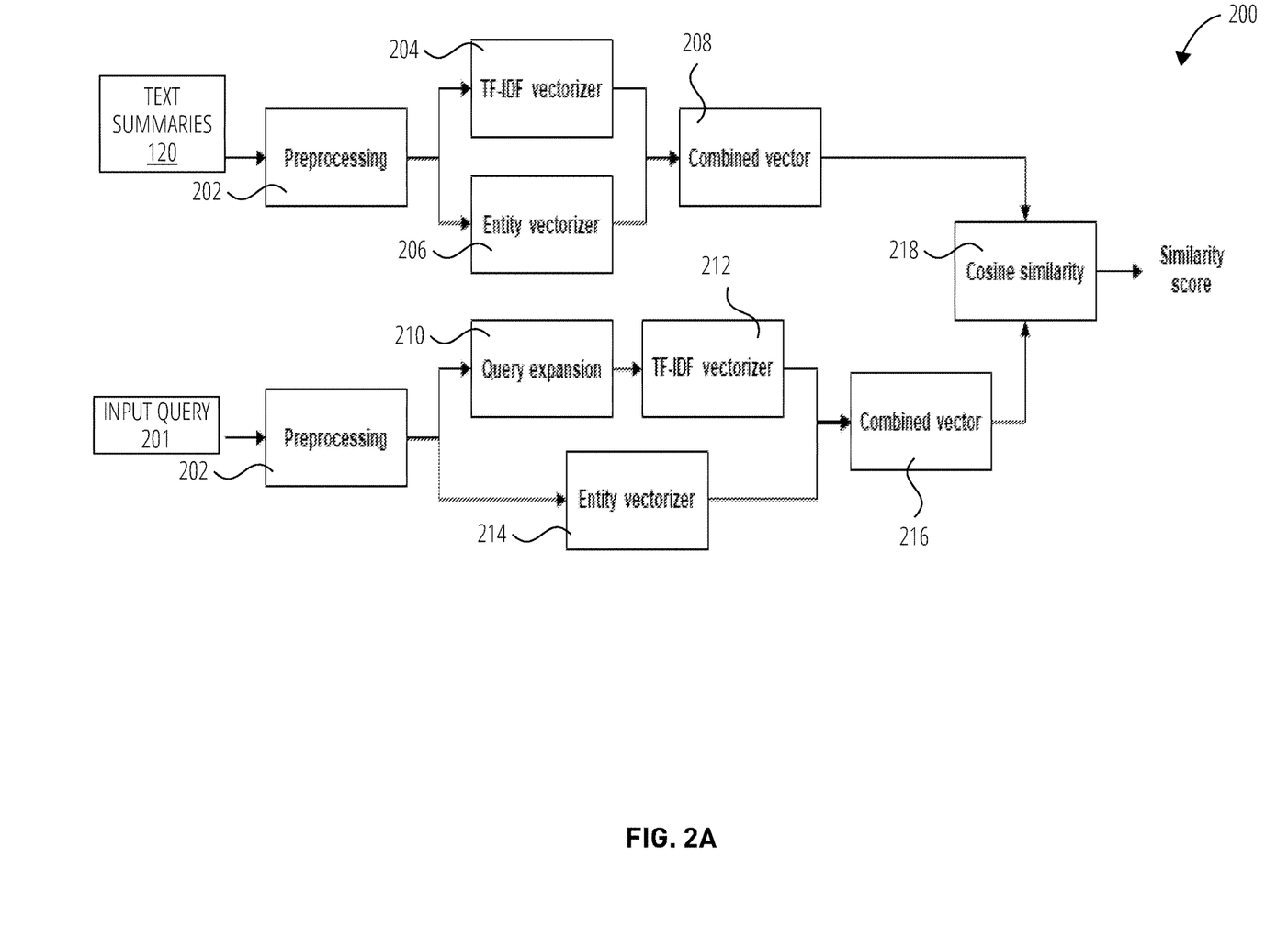
FIG. 2A illustrates an aspect of the subject matter in accordance with one embodiment.

FIG. 2A is a schematic 200 illustrating a processing pipeline performed by the search application 108, consistent with aspects of the disclosure. Generally, the schematic 200 includes a training phase of the corpus 112, where one or more text summaries 120 of the corpus 112 are processed. As shown, the text summaries 120 may be preprocessed during a preprocessing phase at block 202. The preprocessing phase may include any type of operations to format and/or convert the text of the text summaries 120. For example, the preprocessing phase 202 may include converting the text summaries 120 to lowercase, removing stop words, removing one or more predetermined words, removing frequently occurring words in the text (based on a maximum occurrence threshold), removing infrequently occurring text (based on a minimum occurrence threshold), and/or removing personally identifiable information (e.g., names, contact information, etc.).

At block 204, the TF-IDF vectorizer 110 generates a vector for each summary in the text summaries 120. As stated, the vector may be based on a bag-of-words model that represents each word in the text of a given text summary 120 as a feature in the vector. At block 206, the entity vectorizer 114 identifies a plurality of entities in the text summaries 120. As stated, the entity vectorizer 114 may be configured to recognize a plurality of different entities, or concepts, in text. Therefore, the entity vectorizer 114 may process the text of the text summaries 120 and generate, for each text summary 120, a vector reflecting whether each entity is present in the text. Therefore, if the output of the entity vectorizer 114 is a vector of 1000 dimensions, each entry of the vector would indicate whether the text summary 120 includes the corresponding entity, or concept. At block 208, the vectors generated by the TF-IDF vectorizer 110 and the entity vectorizer 114 are combined into a single vector, e.g., via a concatenation operation concatenating the vectors. By computing the combined vector for each text summary 120, the feature matrix 122 may be generated for the corpus 112, where the feature matrix 122 includes each combined vector for the text summaries 120. In some embodiments, the feature matrix 122 is normalized. For example, the rows of the feature matrix 122 may be normalized to L2 unit norm by dividing each value by the norm of the corresponding row vector.

The schematic 200 also reflects one or more operations to process an input query 201. The input query 201 may be any suitable text string. For example, the input query 201 may include the term "risk." At block 202, the input query 201 is preprocessed as described in greater detail above and with reference to FIG. 2B. At block 210, the query expander 116 expands the terms of the input query 201 based on the embeddings 118. For example, the query expander 116 may identify the terms "loss", "fraud", and "default" as exceeding a threshold score computed based on the embeddings 118. Therefore, the query expander 116 may generate an expanded query including the original term "risk" and the additional terms "loss," fraud," and "default." At block 212, the TF-IDF vectorizer 110 computes a vector for the expanded query, where each word of the expanded query is represented as a feature in the vector.

At block 214, the entity vectorizer 114 identifies a plurality of entities, or concepts, in the input query 201, and generates a vector reflecting whether each respective entity and/or concept is present in the input text. At block 216, the search application 108 may combine (e.g., concatenate) the vectors computed by the TF-IDF vectorizer 110 and the entity vectorizer 114 for the input query 201, thereby generating a combined vector. At block 218, the cosine similarity between the combined vector for the query computed at block 216 and the feature matrix 122 computed at block 208 is computed. The cosine similarity may be based on the angle and/or the magnitude of the vectors. In some embodiments, the combined vector computed at block 216 is normalized according to L2 unit norm. In some embodiments, the text summaries 120 with scores exceeding a threshold may be returned. In conventional solutions, computing cosine similarities is computationally expensive, requiring multiple for-loop iterations. Advantageously, however, the cosine similarity scores may be computed using a library that provides optimized matrix multiplication. Based on the similarity scores, one or more results may be returned as responsive to the query. For example, text summaries 120 that are related to the term "risk" of the input query 201 may be returned. Advantageously, doing so may include text summaries 120 that do not explicitly use the term "risk", and would not have been included as results in conventional solutions. Doing so allows additional insights and/or trends to be discovered in the corpus 112.

Figure 2B:
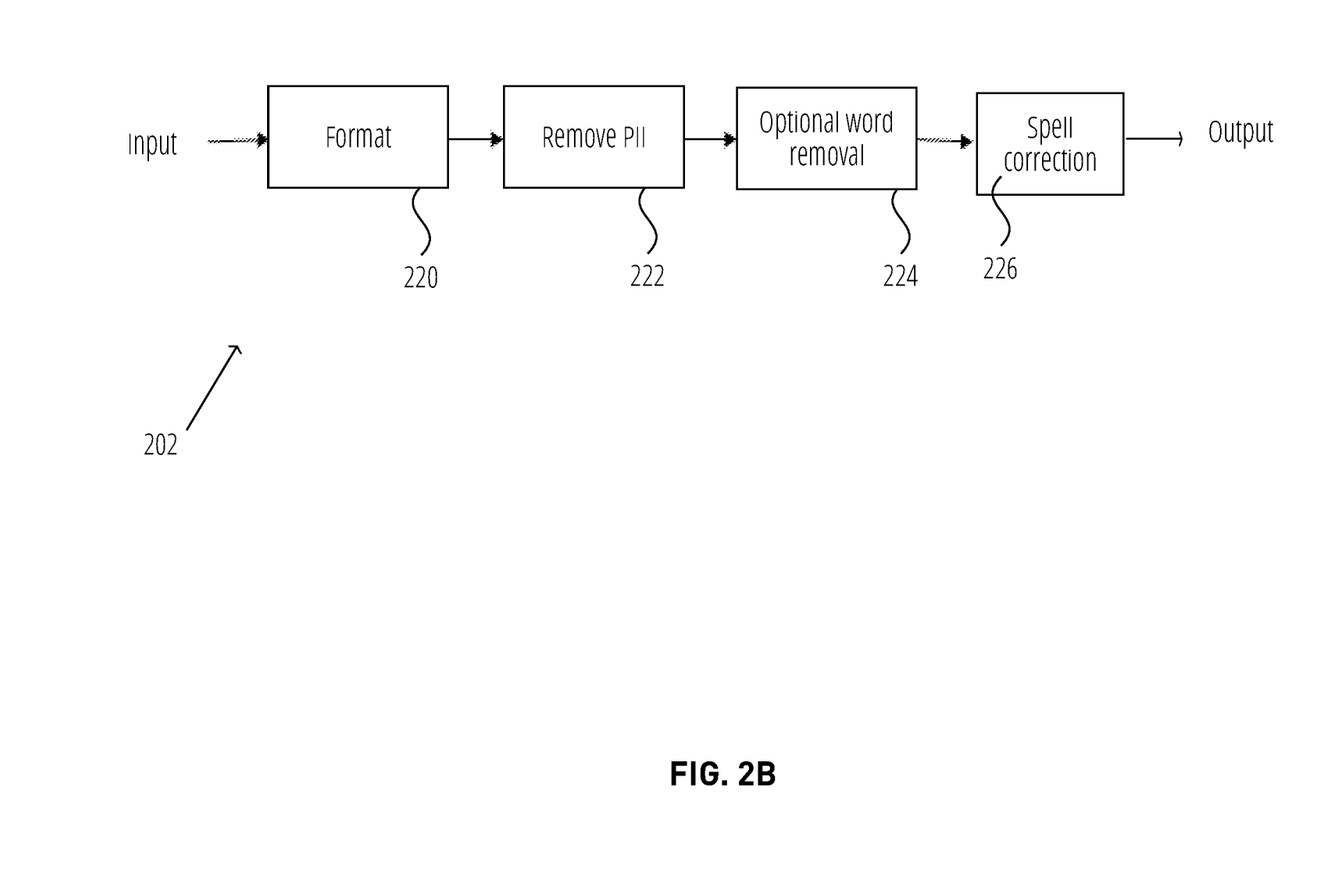
FIG. 2B illustrates an aspect of the subject matter in accordance with one embodiment.

FIG. 2B is a schematic illustrating the preprocessing phase 202 in greater detail. As shown, at block 220, the preprocessing may include converting a format of the text of the text summaries 120 and/or an input query, such as the input query 201. For example, the text may be converted to lowercase. Other formatting operations may be performed. At block 222, personally identifiable information may be removed from the text summaries 120 and/or the input query. The personally identifiable information may include, but is not limited to, names, addresses, email addresses, phone numbers, social security numbers, etc. At block 224, one or more words may be removed from the text summaries 120 and/or the input query. The words may include predetermined stop words (e.g., "the", "it", "because", etc.), words that occur infrequently in the text summaries 120 (e.g., less than 0.01% of the text summaries 120), words that occur frequently in the text summaries 120 (e.g., greater than 25% of the text summaries 120), etc. At block 226, spell checking may be performed on the text summaries 120 and/or the input query, e.g., to correct typographical errors, spelling errors, etc. The output of the preprocessing may then be stored as the corpus 112 and/or a preprocessed input query.

Figure 3A:
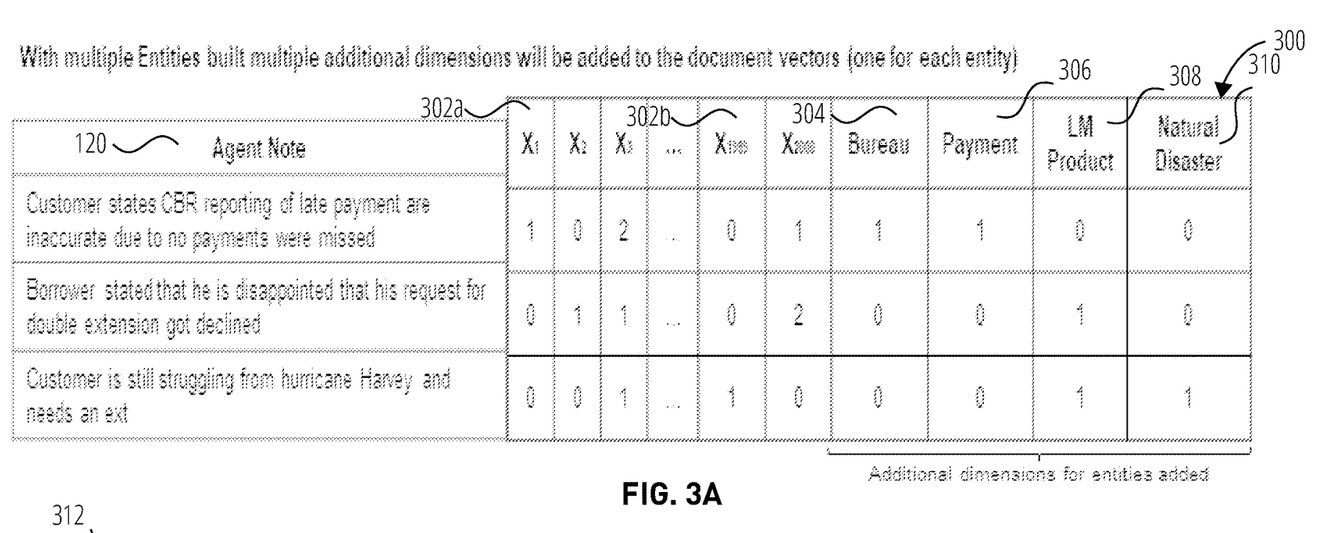
FIG. 3A illustrates an aspect of the subject matter in accordance with one embodiment.

FIG. 3A is a schematic reflecting processing operations performed by the entity vectorizer 114, consistent with disclosed embodiments. As shown, one or more text summaries 120 generated by an agent assisting one or more customers are depicted in a table 300. The columns 302a-302b reflect a plurality of features of the text summaries 120, e.g., features generated by the TF-IDF vectorizer 110 based on a bag-of-words model. However, as shown, the columns 304, 306, 308, and 310 correspond to additional features (or entities and/or concepts) that may be identified in the text summaries 120. For example, these features may include whether the concept of a credit bureau is present in the text summaries 120, whether the concept of payment is present in the text summaries 120, whether the concept of loss management products are present in the text summaries 120, and whether the concept of natural disasters are present in the text summaries 120, respectively. The columns 302a-302b, 304, 306, 308, and 310 may form at least a portion of the feature matrix 122.

By processing the text summaries 120 and/or an input query, the entity vectorizer 114 may determine whether each concept is present in the text, and store a corresponding value in the vector for the text summaries 120 and/or input query. For example, the first depicted summary is labeled with a value of "1" indicating the presence of the credit bureau feature 304, while no other summaries are labeled with this feature (e.g., based on the value of "0".). Similarly, the last depicted summary is labeled with a value of "1" indicating the presence of the natural disaster feature 310, while no other summaries are labeled with this feature (e.g., based on the value of "0".).

Figure 3B:
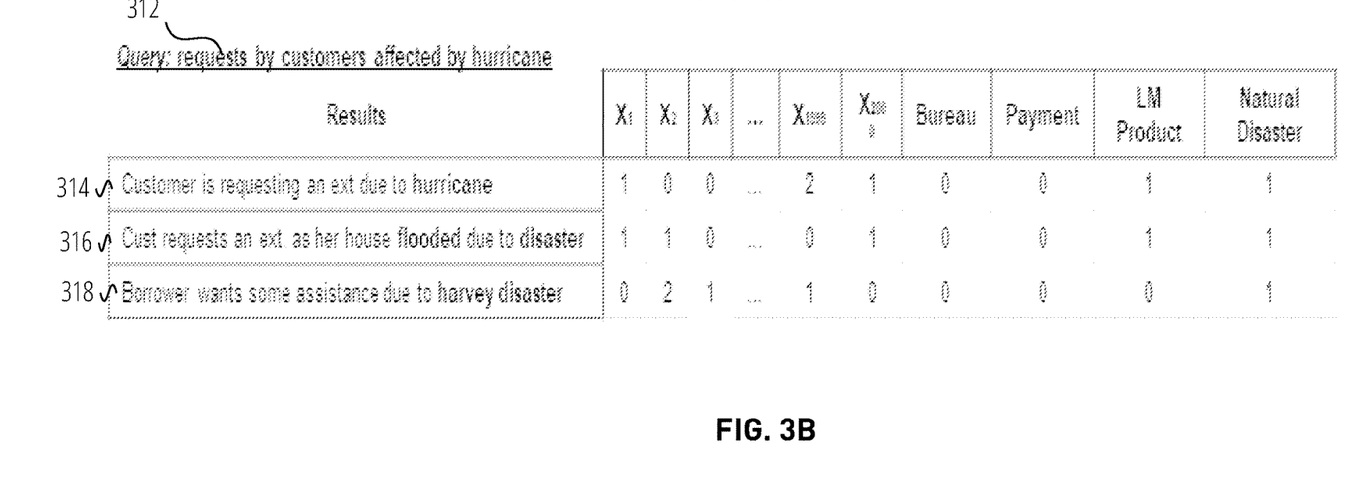
FIG. 3B illustrates an aspect of the subject matter in accordance with one embodiment.

FIG. 3B illustrates an example query 312 processed by the search application 108, according to one aspect of the disclosure. As shown, the query 312 specifies to "requests by customers affected by hurricane." FIG. 3B depicts example search results 314, 316, and 318, each of which corresponds to at least a portion of a respective text summary in the text summaries 120. As shown, each search result includes a score of "1" for the natural disaster column 310. Advantageously, the search results include text summaries 120 that do not mention "hurricane." For example, result 316 specifies that a "house was flooded due to disaster." Therefore, using the techniques of the disclosure, the concept of disaster may be related to the concept of "hurricane", and the result 316 is returned, where conventional solutions may not return the result 316 due to the lack of the term "hurricane" in result 316.

Figure 4A:
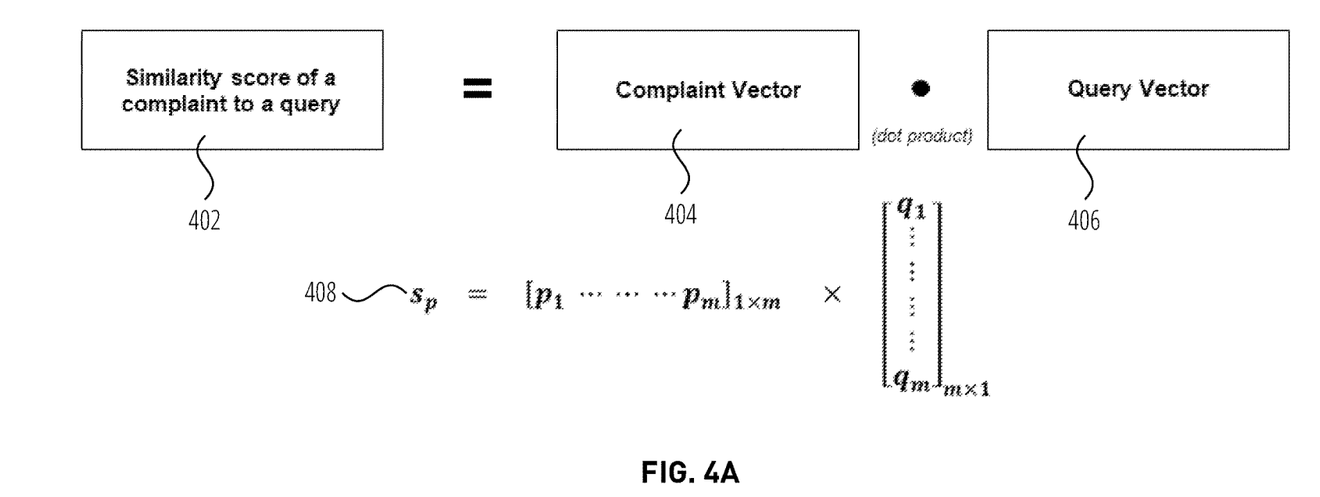
FIG. 4A illustrates an aspect of the subject matter in accordance with one embodiment.

FIG. 4A depicts a processing flow for computing a similarity score reflecting a similarity between a text summary 120 and an input query, according to one aspect. As shown, at block 402, the similarity score may be computed based on the dot product of two vectors. The vectors may include a vector 404 corresponding to a text summary (labeled "complaint" in the Figure) and a vector 406 corresponding to a vector for an input query. The vector 404 may correspond to the combined vector for the text summary, which is based on a concatenation of the vectors computed by the TF-IDF vectorizer 110 and the entity vectorizer 114 for the text summary. The vector 406 may correspond to the combined vector for the query, where the combined query is based on a concatenation of the vector generated by the TF-IDF vectorizer 110 for an expanded query generated by the query expander 116 and a vector generated by the entity vectorizer 114 for the query. As shown in equation 408, the similarity score "$s_p$" is based on the product of two vectors, where the vector labeled with "p" values corresponds to vector 404 (e.g., a column of the feature matrix 122) and the vector labeled with "q" values corresponds to the combined vector 406 for the query.

Figure 4B:
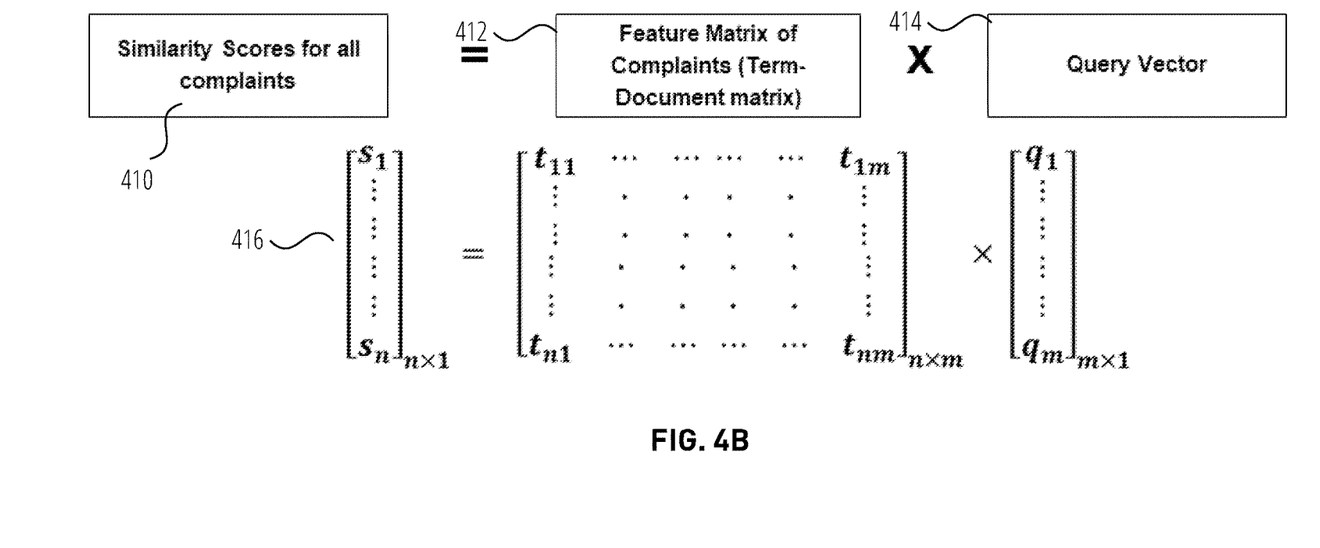
FIG. 4B illustrates an aspect of the subject matter in accordance with one embodiment.

FIG. 4B depicts a processing flow for computing a similarity score reflecting a similarity between a plurality of text summaries 120 represented by a feature matrix 122 and an input query, according to one aspect. As shown, at block 410, the similarity score for all summaries may be computed based on the product of a vector 414 for the query and the feature matrix 122 at block 412. The feature matrix 122 may correspond to the combined vectors for all text summaries, which is based on a concatenation of the vectors computed by the TF-IDF vectorizer 110 and the entity vectorizer 114 for a given text summary. The vector 414 may correspond to the combined vector for the query, where the combined query is based on a concatenation of the vector generated by the TF-IDF vectorizer 110 for an expanded query generated by the query expander 116 and a vector generated by the entity vectorizer 114 for the query. As shown in equation 416, the similarity scores "$s_1$" through "$s_n$" are simultaneously computed based on the product of the vector for the query and the feature matrix 122, where the matrix labeled with "t" values corresponds to feature matrix 122 and the vector labeled with "q" values corresponds to the combined vector 414 for the query.

Figure 5:
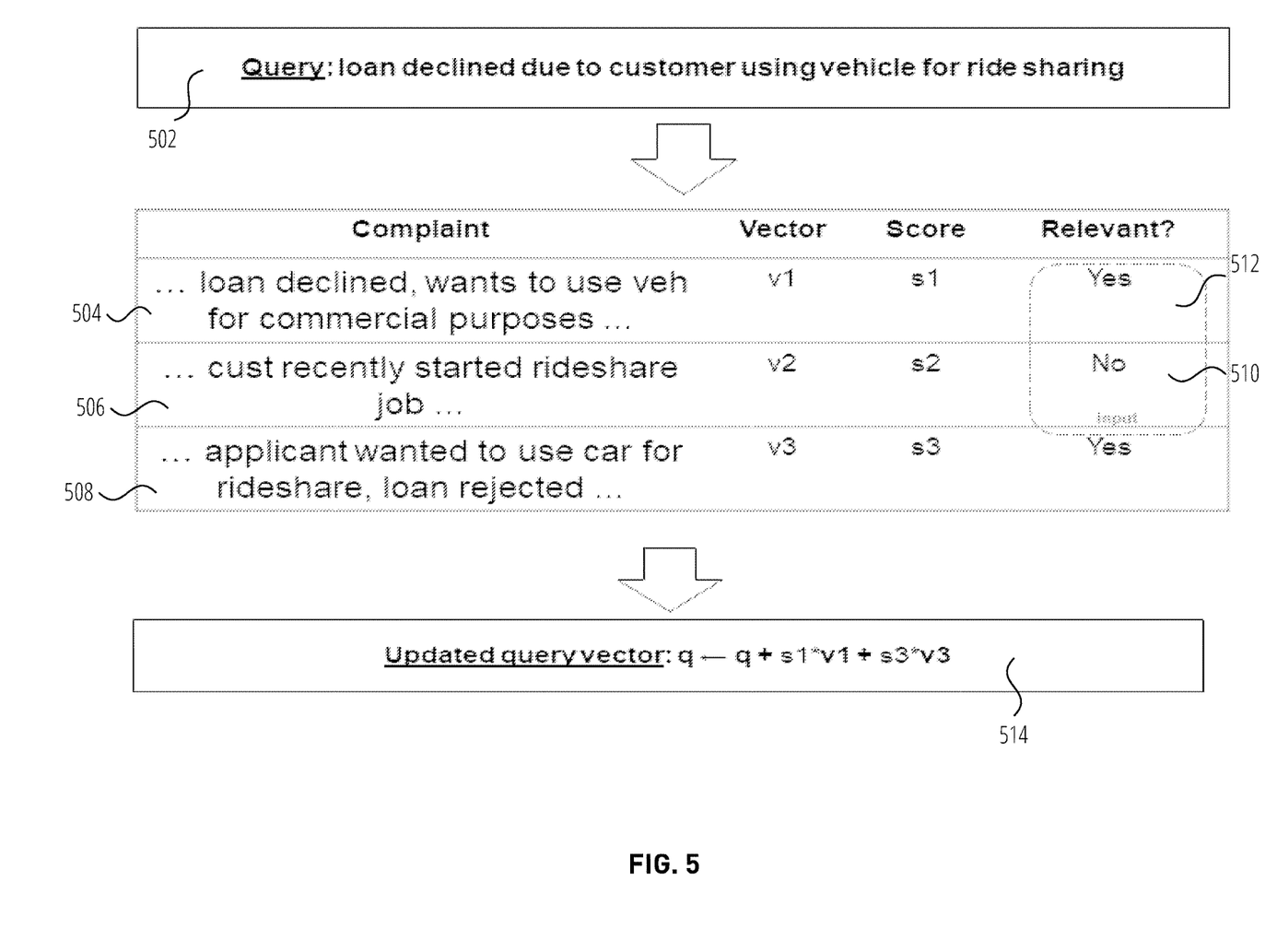
FIG. 5 illustrates an aspect of the subject matter in accordance with one embodiment.

FIG. 5 is a schematic illustrating techniques for providing feedback to query results returned by the search application 108, according to one embodiment. As shown, at block 502, a query may be received as input. The query may be provided as input via any suitable interface, such as a command line interface, graphical user interface, etc. A plurality of results including results 504, 506, and 508 may be returned, where each result corresponds to a respective one of the text summaries 120. As shown, a user may provide feedback indicating whether a result is relevant or not relevant to the query. For example, the user may provide feedback 510 indicating result 506 is not relevant, while feedback 512 indicates result 504 is relevant. Based on the feedback, the search application 108 may update the query vector for the query at block 514. As shown, the updated query vector is based on the original query vector plus vectors v1 and v3, corresponding to text summaries 120 in results 504 and 508, multiplied by their respective scores s1 and s3. However, the updated query vector does not include result 506, as the user indicated the result was relevant. The search application 108 may then recompute the cosine similarity scores between the query vector and the feature matrix 122, and return one or more results. However, given that result 506 was not marked relevant and/or not included in the updated query vector, the updated results may not include result 506. Embodiments are not limited in this context.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. Moreover, not all acts illustrated in a logic flow may be required in some embodiments. In addition, the given logic flow may be implemented by a hardware element, a software element executed by a processor, or any combination thereof. The embodiments are not limited in this context.

Figure 6:
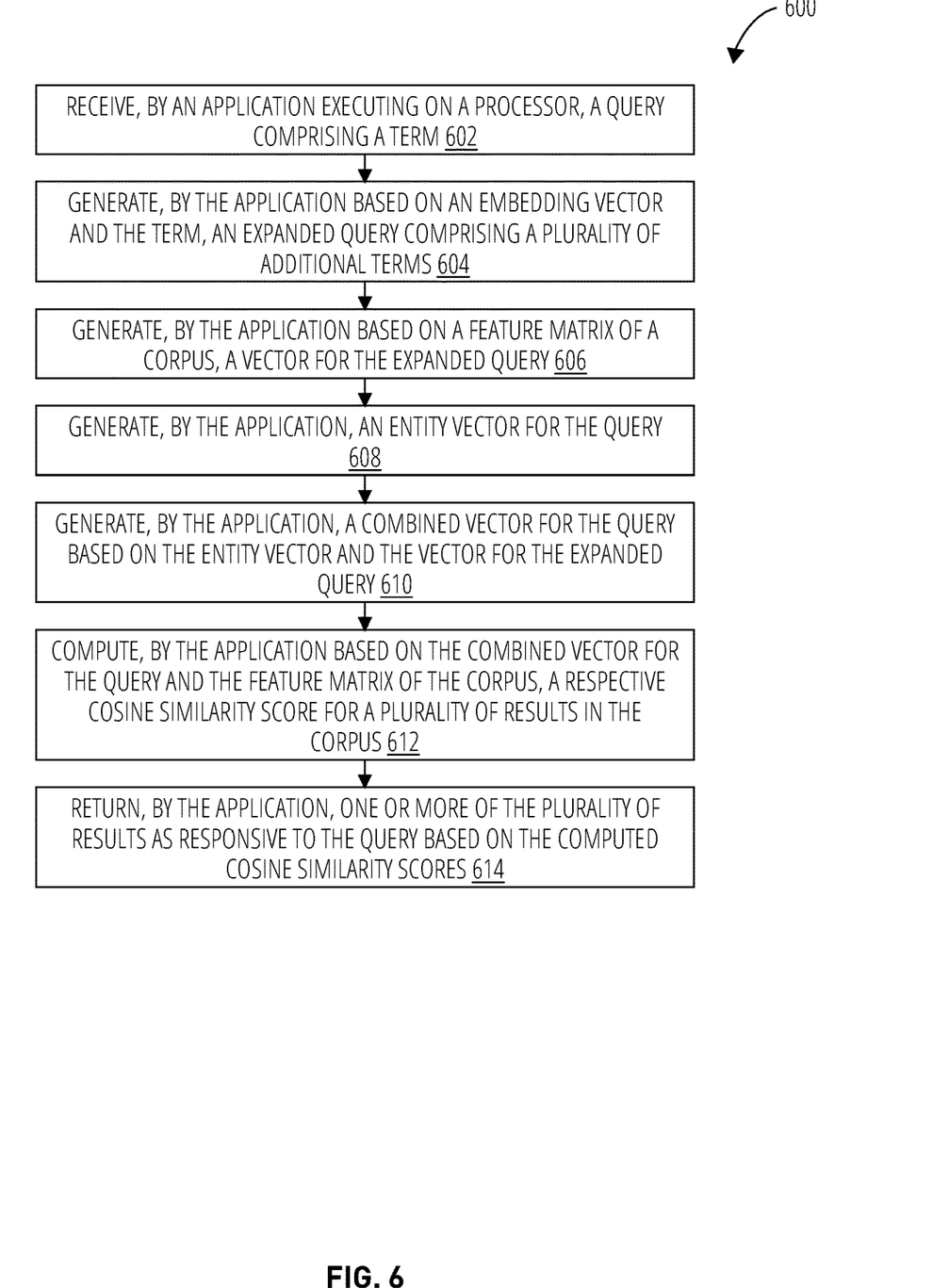
FIG. 6 illustrates a routine 600 in accordance with one embodiment.

FIG. 6 illustrates an embodiment of a logic flow, or routine, 600. The logic flow 600 may be representative of some or all of the operations executed by one or more embodiments described herein. For example, the logic flow 600 may include some or all of the operations for searching unstructured data in the text summaries 120. Embodiments are not limited in this context.

In block 602, routine 600 receives, by the search application 108 executing on a processor, a query comprising a term. In block 604, routine 600 generates, by a query expander 116 of the application based on an embedding vector and the term, an expanded query comprising a plurality of additional terms in addition to the term. The additional terms may be related, or similar, to the term in the query. In block 606, routine 600 generates, by the TF-IDF vectorizer 110 based on a feature matrix 122 of a corpus 112, a vector for the expanded query. In block 608, routine 600 generates, by the entity vectorizer 114, an entity vector for the query. In block 610, routine 600 generates, by the search application 108, a combined vector for the query based on the entity vector and the vector for the expanded query. In block 612, routine 600 computes, by the search application 108 based on the combined vector for the query and the feature matrix of the corpus, a respective cosine similarity score for a plurality of results in the corpus. In block 614, routine 600 returns, by the search application 108, one or more of the plurality of results as responsive to the query based on the computed cosine similarity scores. For example, the search application 108 may return the top 3, top 10, or top 50 scores and associated text summaries 120.

Figure 7:
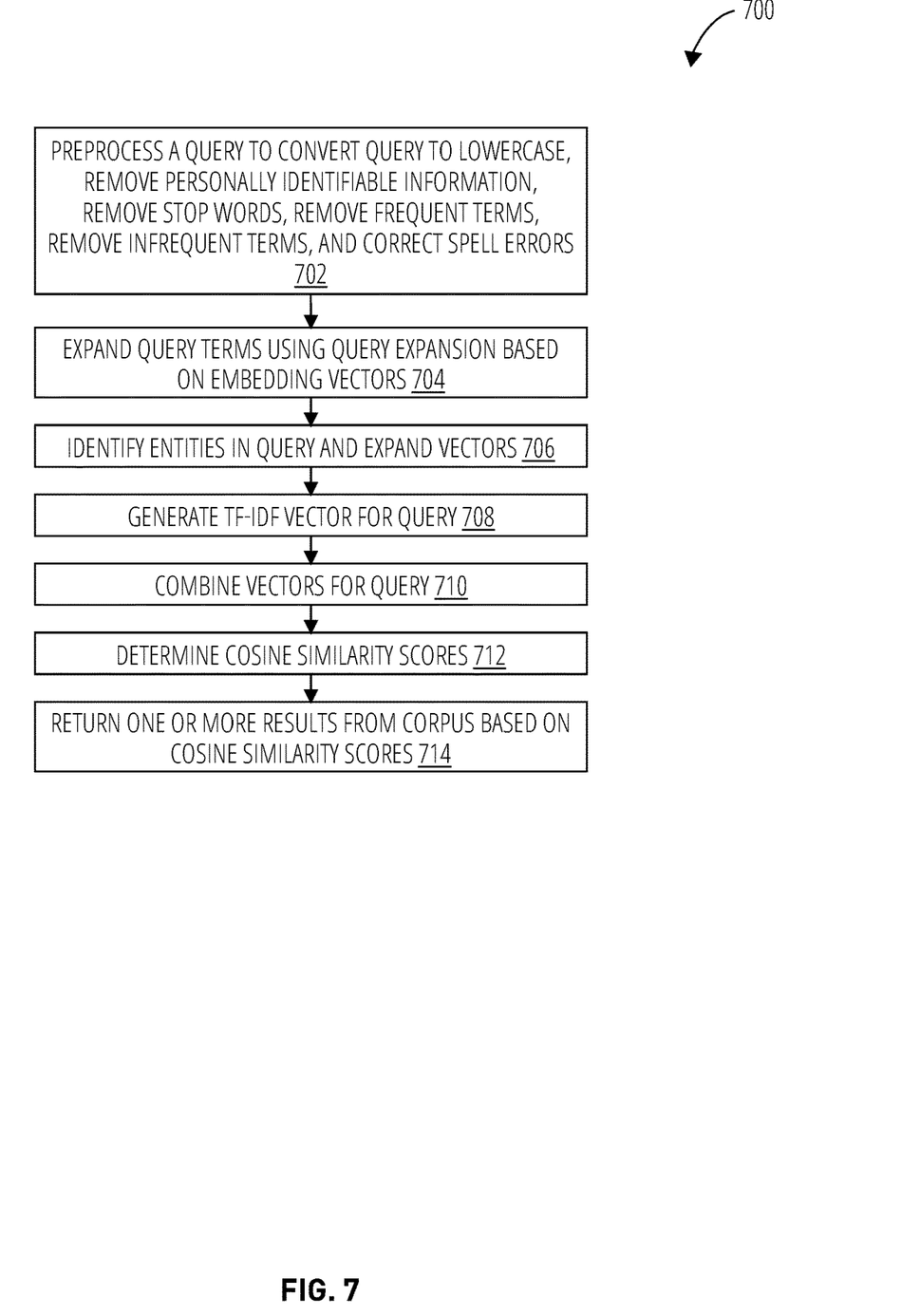
FIG. 7 illustrates a routine 700 in accordance with one embodiment.

FIG. 7 illustrates an embodiment of a logic flow, or routine, 700. The logic flow 700 may be representative of some or all of the operations executed by one or more embodiments described herein. For example, the logic flow 700 may include some or all of the operations for processing queries against the text summaries 120. Embodiments are not limited in this context.

In block 702, routine 700 includes preprocessing a query. The preprocessing may generally convert the query to lowercase, remove personally identifiable information, remove stop words, remove predefined words, and/or correct spelling errors. In block 704, the query expander 116 expands query terms using query expansion based on embedding vectors 118. Generally, doing so returns additional terms and/or concepts for addition to the query. In block 706, the entity vectorizer 114 identifies entities in the query and expands vectors. In block 708, the TF-IDF vectorizer 110 generates a TF-IDF vector for the query. In block 710, routine 700 combines the vectors for the query computed at blocks 706 and block 708. In block 712, routine 700 determines cosine similarity scores, e.g., by computing a product of the combined vector generated at block 710 and the feature matrix 122. In block 714, routine 700 returns one or more text summaries 120 from the corpus 112 based on the cosine similarity scores.

Figure 8:
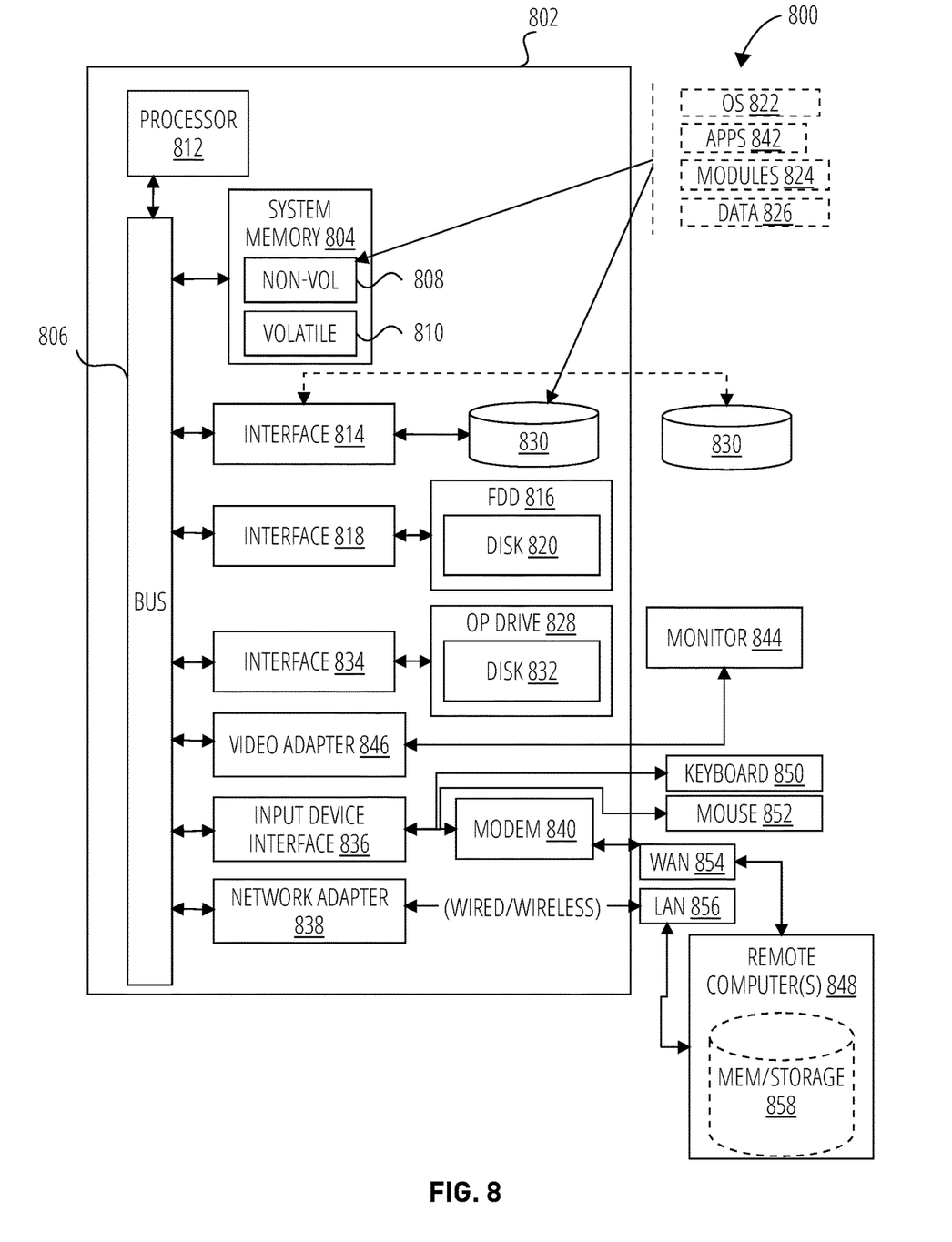
FIG. 8 illustrates a computer architecture 800 in accordance with one embodiment.

FIG. 8 illustrates an embodiment of an exemplary computer architecture 800 suitable for implementing various embodiments as previously described. In various embodiments, the computer architecture 800 may include or be implemented as part of system the computing system 102.

As used in this application, the terms "system" and "component" are intended to refer to a computer-related entity, either hardware, a combination of hardware and software, software, or software in execution, examples of which are provided by the exemplary computing computer architecture 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 100 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 100.

As shown in FIG. 8, the computing architecture 100 includes a processor 812, a system memory 804 and a system bus 806. The processor 812 can be any of various commercially available processors.

The system bus 806 provides an interface for system components including, but not limited to, the system memory 804 to the processor 812. The system bus 806 can be any of several types of bus structure that may further interconnect to a memory bus (with or without a memory controller), a peripheral bus, and a local bus using any of a variety of commercially available bus architectures. Interface adapters may connect to the system bus 806 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 100 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 804 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 804 can include non-volatile 808 and/or volatile 810. A basic input/output system (BIOS) can be stored in the non-volatile 808.

The computer 802 may include various types of computer-readable storage media in the form of one or more lower speed memory units, including an internal (or external) hard disk drive 830, a magnetic disk drive 816 to read from or write to a removable magnetic disk 820, and an optical disk drive 828 to read from or write to a removable optical disk 832 (e.g., a CD-ROM or DVD). The hard disk drive 830, magnetic disk drive 816 and optical disk drive 828 can be connected to system bus 806 by an HDD interface 814, and FDD interface 818 and an optical disk drive interface 834, respectively. The HDD interface 814 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and non-volatile 808, and volatile 810, including an operating system 822, one or more applications 842, other program modules 824, and program data 826. In various embodiments, the one or more applications 842, other program modules 824, and program data 826 can include, for example, the various applications and/or components of the system 102.

A user can enter commands and information into the computer 802 through one or more wire/wireless input devices, for example, a keyboard 850 and a pointing device, such as a mouse 852. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processor 812 through an input device interface 836 that is coupled to the system bus 806 but can be connected by other interfaces such as a parallel port, IEEE 1394 serial port, a game port, a USB port, an IR interface, and so forth.

A monitor 844 or other type of display device is also connected to the system bus 806 via an interface, such as a video adapter 846. The monitor 844 may be internal or external to the computer 802. In addition to the monitor 844, a computer typically includes other peripheral output devices, such as speakers, printers, and so forth.

The computer 802 may operate in a networked environment using logical connections via wire and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all the elements described relative to the computer 802, although, for purposes of brevity, only a memory and/or storage device 858 is illustrated. The logical connections depicted include wire/wireless connectivity to a local area network 856 and/or larger networks, for example, a wide area network 854. Such LAN and WAN networking environments are commonplace in offices and companies, and facilitate enterprise-wide computer networks, such as intranets, all of which may connect to a global communications network, for example, the Internet.

When used in a local area network 856 networking environment, the computer 802 is connected to the local area network 856 through a wire and/or wireless communication network interface or network adapter 838. The network adapter 838 can facilitate wire and/or wireless communications to the local area network 856, which may also include a wireless access point disposed thereon for communicating with the wireless functionality of the network adapter 838.

When used in a wide area network 854 networking environment, the computer 802 can include a modem 840, or is connected to a communications server on the wide area network 854 or has other means for establishing communications over the wide area network 854, such as by way of the Internet. The modem 840, which can be internal or external and a wire and/or wireless device, connects to the system bus 806 via the input device interface 836. In a networked environment, program modules depicted relative to the computer 802, or portions thereof, can be stored in the remote memory and/or storage device 858. It will be appreciated that the network connections shown are exemplary and other means of establishing a communications link between the computers can be used.

The computer 802 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11 (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the devices as previously described with reference to FIGS. 1-8 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
accessing, by an application executing on a processor, a feature matrix for a corpus comprising a plurality of text summaries, wherein the feature matrix represents each term in the plurality of text summaries as a respective feature of a plurality of features, and wherein the feature matrix indicates whether each of a plurality of entities is present in the respective text summary;
receiving, by the application, a query comprising a term;

generating, by the application based on an embedding vector and the term, an expanded query comprising a plurality of additional terms and the term;

generating, by the application based on a term frequency-inverse document frequency (TF-IDF) model, a vector for the expanded query;

generating, by the application, an entity vector for the query;

generating, by the application, a combined vector for the query based on the entity vector and the vector for the expanded query;

computing a respective score for each respective result of a plurality of results from the corpus; and returning, by the application based on the scores, at least one of the plurality of results responsive to the query.

2. The computer-implemented method of claim 1, wherein the scores comprise cosine similarity scores.

3. The computer-implemented method of claim 2, wherein the cosine similarity scores are computed based on a product of the combined vector for the query and at least a portion of the feature matrix of the corpus.

4. The computer-implemented method of claim 1, wherein a plurality of values of the embedding vector are trained based on the corpus, wherein the plurality of text summaries comprises unstructured text.

5. The computer-implemented method of claim 1, wherein the combined vector for the query comprises a plurality of features, the method further comprising:
receiving, by the application, input labeling a first feature of the plurality of features as relevant to the query;
receiving, by the application, input labeling a second feature of the plurality of features as not relevant to the query;
removing, by the application, the second feature from the combined vector for the query; and
updating, by the application, the combined vector based on the remaining plurality of features and a respective weight for each remaining feature.

6. The computer-implemented method of claim 1, further comprising prior to generating the expanded query:
preprocessing, by the application, the query to convert the query from a first format to a second format.

7. A non-transitory computer-readable storage medium, the computer-readable storage medium including instructions that when executed by a processor, cause the processor to:
access a feature matrix for a corpus comprising a plurality of text summaries, wherein the feature matrix represents each term in the plurality of text summaries as a respective feature of a plurality of features, and wherein the feature matrix indicates whether each of a plurality of entities is present in the respective text summary;
receive a query comprising a term;
generate, based on an embedding vector and the term, an expanded query comprising a plurality of additional terms and the term;
generate, based on a term frequency-inverse document frequency (TF-IDF) model, a vector for the expanded query;
generate an entity vector for the query;
generate a combined vector for the query based on the entity vector and the vector for the expanded query;
compute a respective score for each respective result of a plurality of results from the corpus; and
return, based on the scores, at least one of the plurality of results as responsive to the query.

8. The computer-readable storage medium of claim 7, wherein the scores comprise cosine similarity scores.

9. The computer-readable storage medium of claim 8, wherein the cosine similarity scores are computed based on a product of the combined vector for the query and at least a portion of the feature matrix of the corpus.

10. The computer-readable storage medium of claim 7, wherein a plurality of values of the embedding vector are trained based on the corpus, wherein the plurality of text summaries comprises unstructured text.

11. The computer-readable storage medium of claim 7, wherein the combined vector for the query comprises a plurality of features, wherein the instructions further cause the processor to:
receive input labeling a first feature of the plurality of features as relevant to the query;
receive input labeling a second feature of the plurality of features as not relevant to the query;
remove the second feature from the combined vector for the query; and
update the combined vector based on the remaining plurality of features and a respective weight for each remaining feature.

12. The computer-readable storage medium of claim 7, wherein the instructions further cause the processor to, prior to generating the expanded query:
preprocess the query to convert the query from a first format to a second format.

13. A computing apparatus comprising:
a processor; and
a memory storing instructions that, when executed by the processor, cause the processor to:
access a feature matrix for a corpus comprising a plurality of text summaries, wherein the feature matrix represents each term in the plurality of text summaries as a respective feature of a plurality of features, and wherein the feature matrix indicates whether each of a plurality of entities is present in the respective text summary;
receive a query comprising a term;
generate, based on an embedding vector and the term, an expanded query comprising a plurality of additional terms and the term;
generate, based on a term frequency-inverse document frequency (TF-IDF) model, a vector for the expanded query;
generate an entity vector for the query;
generate a combined vector for the query based on the entity vector and the vector for the expanded query;
compute a respective score for each respective result of a plurality of results from the corpus; and
return, based on the scores, at least one of the plurality of results as responsive to the query.

14. The computing apparatus of claim 13, wherein the scores comprise cosine similarity scores.

15. The computing apparatus of claim 14, wherein the cosine similarity scores are computed based on a product of the combined vector for the query and at least a portion of the feature matrix of the corpus.

16. The computing apparatus of claim 13, wherein a plurality of values of the embedding vector are trained based on the corpus, wherein the plurality of text summaries comprises unstructured text.

17. The computing apparatus of claim 13, wherein the instructions further cause the processor to, prior to generating the expanded query: preprocess the query to convert the query from a first format to a second format.

18. The method of claim 1, wherein the scores are computed based on the combined vector for the query and at least a portion of the feature matrix of the corpus.

19. The computer-readable storage medium of claim 7, wherein the scores are computed based on the combined vector for the query and at least a portion of the feature matrix of the corpus.

20. The computing apparatus of claim 13, wherein the scores are computed based on the combined vector for the query and at least a portion of the feature matrix of the corpus.

* * * * *